US008329287B2

(12) United States Patent
Sasaki et al.

(10) Patent No.: US 8,329,287 B2
(45) Date of Patent: *Dec. 11, 2012

(54) VOID-CONTAINING RESIN MOLDED PRODUCT, PRODUCTION METHOD THEREFOR, AND REFLECTIVE PLATE

(75) Inventors: Hiroki Sasaki, Shizuoka (JP); Tooru Ogura, Shizuoka (JP); Yasutomo Goto, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 358 days.

This patent is subject to a terminal disclaimer.

(21) Appl. No.: 12/532,891

(22) PCT Filed: Feb. 12, 2008

(86) PCT No.: PCT/JP2008/052238
§ 371 (c)(1),
(2), (4) Date: Sep. 24, 2009

(87) PCT Pub. No.: WO2008/126464
PCT Pub. Date: Oct. 23, 2008

(65) Prior Publication Data
US 2010/0073788 A1 Mar. 25, 2010

(30) Foreign Application Priority Data
Mar. 30, 2007 (JP) .................................. 2007-095037

(51) Int. Cl.
*B32B 3/26* (2006.01)
*B29C 55/02* (2006.01)

(52) U.S. Cl. ............... 428/314.2; 428/314.4; 428/314.8; 264/291

(58) Field of Classification Search ............... 428/314.4, 428/314.8, 315.5, 315.7, 314.2; 264/291
See application file for complete search history.

(56) References Cited

U.S. PATENT DOCUMENTS

2004/0062921 A1* 4/2004 Laney et al. ............... 428/304.4
2007/0154662 A1* 7/2007 Tanaka et al. ............... 428/32.39
(Continued)

FOREIGN PATENT DOCUMENTS
JP 51146571 A * 12/1976
(Continued)

*Primary Examiner* — Hai Vo
(74) *Attorney, Agent, or Firm* — Sughrue Mion, PLLC

(57) ABSTRACT

A void-containing resin molded product consisting of a polymer having crystallinity, wherein the void-containing resin molded product has elongated voids whose longitudinal directions are aligned in one direction, wherein the elongated voids satisfy the expression $h(avg)>T/100$, where $h(avg)$ denotes an arithmetic average of $h(i)$s which each denote a distance from a surface of the void-containing resin molded product to a center of each of 10 voids whose centers are closer to the surface of the void-containing resin molded product than are centers of any other voids in a cross-section of the void-containing resin molded product that is perpendicular to a direction in which the voids are aligned, the 10 voids being selected from voids in a region defined by one straight line which is parallel to a thickness direction of the void-containing resin molded product and another straight line which is parallel to and distant by $20 \times T$ from the one straight line; and T denotes an arithmetic average thickness of the cross-section, and wherein the elongated voids have a ratio $L/r$ of 10 or more, where L denotes an average length of the voids (in μm) in a direction in which the voids are aligned, and r denotes an average length of the voids (in μm) in a thickness direction which is perpendicular to the direction in which the voids are aligned.

6 Claims, 4 Drawing Sheets

U.S. PATENT DOCUMENTS

| | | | |
|---|---|---|---|
| 2010/0099787 A1* | 4/2010 | Arioka et al. | 521/149 |
| 2011/0160325 A1* | 6/2011 | Goto et al. | 521/143 |

FOREIGN PATENT DOCUMENTS

| | | | |
|---|---|---|---|
| JP | 62-019206 A | | 1/1987 |
| JP | 63-309534 A | | 12/1988 |
| JP | 10-45930 A | | 2/1998 |
| JP | 10-176072 A | | 6/1998 |
| JP | 3067557 A | | 5/2000 |
| JP | 2003-105115 A | | 4/2003 |
| JP | 2005205905 A | * | 8/2005 |
| JP | 2005-281396 A | | 10/2005 |
| JP | 2006-008942 A | | 1/2006 |

* cited by examiner

VOID-CONTAINING RESIN MOLDED PRODUCT, PRODUCTION METHOD THEREFOR, AND REFLECTIVE PLATE

TECHNICAL FIELD

The present invention relates to a void-containing resin molded product consisting of a crystalline polymer, a production method therefor, and a reflective plate.

BACKGROUND ART

Void-containing resin films or sheets are used as, for example, illumination members of electronic devices, illumination members for household use, and inner lighting sign boards, by virtue of, for example, their heat-insulating properties, cushion properties, and light-transmitting properties (or light-blocking properties).

Particularly in recent years, as liquid crystal TVs and computers are more and more popular, such a reflective plate that has higher reflectivity is required to be used as a reflective plate of liquid crystal devices.

In one technique for providing a reflective plate with higher reflectivity, a large number of fine voids are formed in a polyester resin (see, for example, Patent Literatures 1 to 3). When a void-containing layer is formed as a result of formation of fine voids in a polyester resin, the reflectivity of the polyester resin increases by virtue of the void-containing layer.

The technique described in Patent Literature 1 involves addition of inorganic fine particles to a polyester resin film, so that voids are formed within a film as the inorganic fine particles are separated from the resin interface during the stretching of the resin into a film. According to the technique described in Patent Literature 1, the addition of inorganic particles attains void formation to increase the reflectivity of the film.

However, the technique described in Patent Literature 1 requires not only sophisticated techniques and devices for dispersing fine particles, but also additives to reduce the aggregation of particles and pre-treatments of the fine particles, resulting in a complicated production process and increased cost.

In addition, if a foam layer is formed in the proximity of the surface of the polyester resin film, the surface smoothness may be impaired due to foaming.

In the technique described in Patent Literature 2, a major resin component (such as polyester) and another resin component incompatible with the major resin are mixed/kneaded to form a two-phase structure (such as islet structure). The interface between the major resin component and the other resin component added to and kneaded with the major resin is cleaved as the resin is stretched into a film, thus resulting in the formation of voids. The size of the incompatible phase may be made uniform, so that the voids can be easily controlled and the performance of the reflective plate can be improved.

When the technique described in Patent Literature 2 is used to produce a film, generally, an islet structure is formed and then its interface is cleaved as the resin is stretched into a film, thus resulting in the formation of voids. When this mechanism is employed, it would be difficult to form islets small enough to provide a desired two-phase structure. As a result, the resulting voids may not be sufficiently small (i.e., difficult to control the size).

In addition, if a foam layer is formed in the proximity of the surface of the polyester resin film, the surface smoothness may be impaired due to foaming.

Each of the techniques described in Patent Literatures 1 and 2 involves mixing into a major component other components that serve as nuclei to form voids. These components remain within the voids and may hinder the increase in reflectivity. In addition, the systems used in these techniques include a resin and an inorganic material or include different resins, and are therefore difficult to recycle.

A technique described in Patent Literature 3 involves exposing a resin film to an inert gas under pressure to impregnate the resin film with the inert gas, and stretching the resin film under atmospheric pressure to form a porous stretched resin film. Since this technique uses a gas as a source of voids, the problems involving degradation of reflectivity and recyclability can be avoided.

However, to impregnate the film with the inert gas under pressure, the entire film needs to be treated under a high pressure of several tens atm or over one-hundred atm. This requires a large-scale facility and can significantly add to the cost as compared to typical film-making apparatuses that involve melting and stretching of the film. In addition, the large volume of inert gas used in this technique requires additional equipment and countermeasures to ensure safety of operators, further adding to the cost. This technique also requires sophisticated control of conditions of the production process for ensuring uniform foaming.

Patent Literature 1: Japanese Patent (JP-B) No. 3067557
Patent Literature 2: Japanese Patent Application Laid-Open (JP-A) No. 2005-281396
Patent Literature 3: JP-A No. 2006-8942

DISCLOSURE OF INVENTION

The present invention addresses the above problems pertinent in the art and aims to achieve the following objects. Accordingly, an object of the present invention is to provide a void-containing resin molded product having high reflectivity and a method for producing such a molded product. Another object of the present invention is to provide a reflective plate with excellent reflectivity that includes the void-containing resin molded product.

The present inventors conducted extensive studies to solve the above-described problems, and have found that when stretched at high speed, a polymer film consisting of polybutylene terephthalate (PBT) or polypropylene (PP) forms a void-containing film that has a void-containing structure (multilayered structure with several tens of layers) formed of a PBT layer (refractive index=about 1.5) and an air (void)-containing layer (refractive index=1), a void-containing structure (multilayered structure with several tens of layers) formed of a PP layer (refractive index=about 1.47) and an air (void) layer (refractive index=1). The high reflectivity of the reflective plate attributes to structural optical interference between the multiple layers (structural color development). Further, this void-containing resin film contains no voids not only in the film surface but also in a region from the film surface to a predetermined depth and thus, the present inventors have found that the void-containing resin film has excellent surface smoothness.

The present invention has been accomplished on the basis of this finding obtained by the present inventors. Means for solving the above problems are as follows.

<1> A void-containing resin molded product consisting of:
a polymer having crystallinity,
wherein the void-containing resin molded product has elongated voids whose longitudinal directions are aligned in one direction,
wherein the elongated voids satisfy the expression h(avg) >T/100, where h(avg) denotes an arithmetic average of h(i)s which each denote a distance from a surface of the void-containing resin molded product to a center of each of 10 voids whose centers are closer to the surface of the void-containing resin molded product than are centers of any other voids in a cross-section of the void-containing resin molded product that is perpendicular to a direction in which the voids are aligned, the 10 voids being selected from voids in a region defined by one straight line which is parallel to a thickness direction of the void-containing resin molded product and another straight line which is parallel to and distant by 20×T from the one straight line; and T denotes an arithmetic average thickness of the cross-section, and
wherein the elongated voids have a ratio L/r of 10 or more, where L denotes an average length of the voids (in μm) in the direction in which the voids are aligned, and r denotes an average length of the voids (in μm) in the thickness direction which is perpendicular to the direction in which the voids are aligned.

<2> The void-containing resin molded product according to <1> above, wherein the void-containing resin molded product has a glossiness of 50 or higher, and has a ratio M/N of 0.2 or less, where M denotes a transmittance (%) of the void-containing resin molded product with respect to light having a wavelength of 400 nm to 800 nm, and N denotes a transmittance (%) of a void-free polymer molded product, with respect to the same light, having the same thickness as the void-containing resin molded product and consisting of the same polymer that forms the void-containing resin molded product.

<3> The void-containing resin molded product according to any one of <1> and <2> above, wherein the void-containing resin molded product satisfies a product of ΔN and P of 3 or more, where P denotes an average number of the voids in the thickness direction that is perpendicular to the direction in which the voids are aligned, ΔN denotes a difference between N1 and N2 (=N1−N2), where N1 denotes a refractive index of a layer of the polymer with respect to light having a wavelength of 400 nm to 800 nm, and N2 denotes a refractive index of a void-containing layer with respect to the same light.

<4> The void-containing resin molded product according to any one of <1> to <3> above, wherein the void-containing resin molded product consists of one type of the polymer having crystallinity.

<5> The void-containing resin molded product according to any one of <1> to <4> above, wherein the polymer having crystallinity is at least any one of a polyester, a polyolefin and a polyamide.

<6> The void-containing resin molded product according to any one of <1> to <5> above, wherein the voids are formed by stretching a polymer molded product consisting of the polymer having crystallinity at a speed of 10 mm/min to 36,000 mm/min and at a stretching temperature T (° C.) which falls within the following range:

(Tg−30)(° C.)≦T(° C.)≦(Tg+50)(° C.)

where Tg denotes a glass transition temperature (° C.) of the polymer having crystallinity.

<7> A method for producing the void-containing resin molded product according to any one of <1> to <6> above, the method including:
stretching a polymer molded product consisting of a polymer having crystallinity at a speed of 10 mm/min to 36,000 mm/min and at a stretching temperature T(° C.) which falls within the following range:

(Tg−30)(° C.)≦T(° C.)≦(Tg+50)(° C.)

where Tg denotes a glass transition temperature (° C.) of the polymer having crystallinity.

<8> A reflective plate including:
the void-containing resin molded product according to any one of <1> to <6> above.

The present invention can provide a void-containing resin molded product exhibiting high reflectivity and a production method therefor, which can solve the existing problems. Furthermore, the present invention can provide a reflective plate containing the void-containing resin molded product and having excellent reflectivity.

Figure 1:
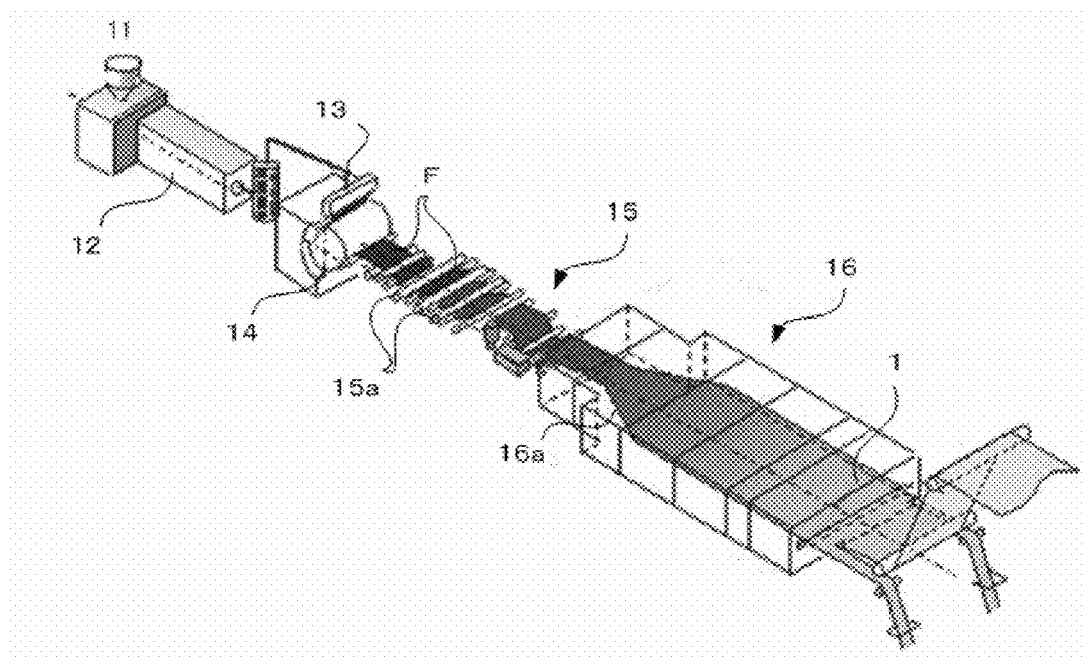
FIG. 1 is a flow diagram of a biaxial stretching film-forming apparatus, showing one example of a production method of void-formed resin molded products of the present invention.

BEST MODE FOR CARRYING OUT THE INVENTION (Void-containing resin molded product)
The void-containing resin molded product of the present invention consists of a polymer having crystallinity. If necessary, the molded product may contain other optional components.

As used herein, "molded product" may be any molded product suitably selected depending on the intended purpose. Examples include films and sheets.

<Polymer Having Crystallinity>
Polymers are generally divided into polymers having crystallinity and amorphous polymers. The polymers having crystallinity are not necessarily formed of crystals only. Rather, their molecular structure contains crystalline regions in which long chain molecules are aligned in a regular pattern and amorphous regions in which the molecules are not aligned regularly.

Thus, the crystalline polymer to form the void-containing resin molded products of the present invention contains at least crystalline regions in their molecular structure and may also contain amorphous regions along with the crystalline regions.

The polymer having crystallinity is not particularly limited and may appropriately selected depending on the intended purpose. Examples thereof include high-density polyethylenes, polyolefins (such as polypropylene), polyamides (PA) (such as Nylon-6), polyacetals (POM), polyesters (such as PET, PEN, PTT, PBT and PBN), syndiotactic polystyrenes (SPS), polyphenylene sulfides (PPS), polyether ether ketones (PEEK), liquid crystal polymers (LCP) and fluorine resins. Of these, polyesters, syndiotactic polystyrenes (SPS) and liquid crystal polymers (LCP) are preferred from the viewpoints of their mechanical strength and readiness for production. Polyesters are particularly preferred. Two or more of these polymers may be blended together or copolymerized with one another.

While the polymer having crystallinity may have any melt viscosity suitably selected depending on the intended purpose, it preferably has a melt viscosity of 50 Pa·s to 700 Pa·s, more preferably 70 Pa·s to 500 Pa·s, still more preferably 80 Pa·s to 300 Pa·s. The crystalline polymer having a melt viscosity of 50 Pa·s to 700 Pa·s is preferred since the melted film extruded from a die head during the melt film-forming process is stabilized in shape and becomes suitable for making uniform films. The crystalline polymer having a melt viscosity of 50 Pa·s to 700 Pa·s is also preferred since the viscosity of the polymer becomes suitable for extrusion during the melt film-forming process and the surface of the melted film is leveled to reduce formation of projections and recesses during the film-forming process.

The viscosity can be measured by a plate-type rheometer and a capillary rheometer.

While the polymer having crystallinity may have any intrinsic viscosity (IV) suitably selected depending on the desired purpose, it preferably has an intrinsic viscosity of 0.4 to 1.2, more preferably 0.6 to 1.0, still more preferably 0.7 to 0.9. The crystalline polymer having an IV of 0.4 to 1.2 is preferred since the resulting film has high strength and can thus be effectively stretched.

The IV can be measured by an Ubbelohde viscometer.

While the polymer having crystallinity may have any melting point (Tm) suitably selected depending on the desired purpose, it preferably has a melting point of 40° C. to 350° C., preferably 100° C. to 300° C., still more preferably 150° C. to 260° C. The crystalline polymer having a melting point of 40° C. to 350° C. is preferred since it can maintain its shape in a temperature range within which the polymer is expected to be generally used. This temperature range is also preferred since the polymer can be formed into uniform films without using special techniques that are otherwise required for high temperature processing.

The melting point can be measured by a differential scanning calorimeter (DSC). —Polyester Resin—

The term "polyester" (hereinafter referred to as a "polyester resin") is a collective term for polymers in which the polymer backbone is primarily formed by ester bonds. Thus, the polyester resins suitable for the above-described crystalline polymers include not only the above-described polyesters (i.e., polyethylene terephthalate (PET), polyethylene naphthalate (PEN), polytrimethylene terephthalate (PTT), polybutylene terephthalate (PBT) and polybutylene naphthalate (PBN)), but also any polymer obtained through polycondensation of a dicarboxylic acid component with a diol component.

The dicarboxylic acid component may be any dicarboxylic acid suitably selected depending on the intended purpose, including aromatic dicarboxylic acids, aliphatic dicarboxylic acids, alicyclic dicarboxylic acids, oxycarboxylic acids and polyfunctional acids. Of these, aromatic dicarboxylic acids are particularly preferred.

Preferred examples of the aromatic dicarboxylic acids include terephthalic acid, isophthalic acid, diphenyl dicarboxylic acid, diphenyl sulfone dicarboxylic acid, naphthalene dicarboxylic acid, diphenoxyethane dicarboxylic acid and 5-sodium sulfoisophthalic acid. Of these, terephthalic acid, isophthalic acid, diphenyl dicarboxylic acid and naphthalene dicarboxylic acid are preferred, with terephthalic acid, diphenyl dicarboxylic acid and naphthalene dicarboxylic acid being particularly preferred.

Examples of the aliphatic dicarboxylic acids include oxalic acid, succinic acid, eicosanoic acid, adipic acid, sebacic acid, dimer acid, dodecandionic acid, maleic acid and fumaric acid. Examples of the alicyclic dicarboxylic acids include cyclohexane dicarboxylic acid. Examples of the oxycarboxylic acids include p-oxybenzoic acid. Examples of the polyfunctional acids include trimellitic acid and pyromellitic acid.

The diol component may be any diol suitably selected depending on the intended purpose, including aliphatic diols, alicyclic diols, aromatic diols, diethylene glycol and polyalkylene glycol. Of these, aliphatic diols are particularly preferred.

Examples of the aliphatic diols include ethylene glycol, propane diol, butane diol, pentane diol, hexane diol, neopentyl glycol and triethylene glycol. Of these, propane diol, butane diol, pentane diol and hexane diol are particularly preferred. Examples of the alicyclic diols include cyclohexane dimethanol. Examples of the aromatic diols include bisphenol A and bisphenol S.

While the polyester resin may have any melt viscosity suitably selected depending on the intended purpose, it preferably has a melt viscosity of 50 Pa·s to 700 Pa·s, more preferably 70 Pa·s to 500 Pa·s, still more preferably 80 Pa·s to 300 Pa·s. Although a higher melt viscosity is more likely to result in the formation of voids during stretching of the film, the polyester resin having a melt viscosity of 50 Pa·s to 700 Pa·s is preferred since such a resin can be easily extruded during the film-forming process and can form a stable flow of resin that is less likely to stagnate. As a result, the quality of the film can be stabilized. The polyester resin having a melt viscosity of 50 Pa·s to 700 Pa·s is also preferred since the tension is suitably maintained during stretching of the film, so that the film can be stretched uniformly and is less likely to tear. Another reason why the polyester resin having a melt viscosity of 50 Pa·s to 700 Pa·s is preferred is that such a resin can improve physical properties of the film. For example, such a resin allows the shape of the melted film extruded from a die head during the film-forming process to be easily maintained, so that the film can be shaped in a stable manner and the resulting products become less susceptible to damage.

While the polyester resin may have any intrinsic viscosity (IV) suitably selected depending on the desired purpose, it preferably has an intrinsic viscosity of 0.4 to 1.2, more preferably 0.6 to 1.0, still more preferably 0.7 to 0.9. Although a higher IV is more likely to result in the formation of voids during stretching of the film, the polyester resin having an IV of 0.4 to 1.2 is preferred since such a resin can be easily extruded during the film-forming process and can form a stable flow of resin that is less likely to stagnate. As a result, the quality of the film can be stabilized. The polyester resin having an IV of 0.4 to 1.2 is also preferred since the tension is suitably maintained during stretching of the film, so that the film can be stretched uniformly, resulting in a decreased load applied to the system. Another reason why the polyester resin having an IV of 0.4 to 1.2 is preferred is that such a resin can improve physical properties of the product, making it less susceptible to damage.

While the polyester resin may have any melting point suitably selected depending on the desired purpose, it preferably has a melting point of 150° C. to 300° C., more preferably 180° C. to 270° C., to ensure heat resistance and formability of the resin into the film.

The polyester resin may be composed of a single type of the dicarboxylic acid component and a single type of the diol component that are polymerized together to form a polymer, or it may be composed of two or more types of the dicarboxylic acid component and/or the diol component that are copolymerized to form a polymer. Alternatively, two or more types of polymers may be blended together to provide the polyester resin.

When two or more types of polymers are blended together, the auxiliary polymer to be added to the main polymer preferably has a melt viscosity and intrinsic viscosity that are close to those of the main polymer and is preferably added in a smaller amount relative to the main polymer to improve the physical properties of the polyester resin in the film-forming process or the melt extrusion and to thus facilitate the extrusion of the polyester resin.

When desired, a resin other than polyester resins may be added to the polyester resin to improve the fluidity of the polyester resin, to control the light transmittance of the polyester resin, or to improve the adhesion of the polyester resin to a coating solution.

As described above, voids can be formed in the void-containing resin molded product of the present invention in a simple step without adding inorganic fine particles, incompatible resins and other void-forming agents. Moreover, the void-containing resin molded product of the present invention does not require special facilities for dissolving an inert gas in the resin. The production method of the void-containing resin molded product will be described below.

When necessary, the void-containing resin molded product may contain other optional components that do not affect the formation of voids. Such other components include a heat resistance stabilizer, an antioxidant, an organic lubricant, a nucleating agent, a dye, a pigment, a dispersing agent and a coupling agent. Whether these components can contribute to the formation of voids can be determined by detecting the presence of other components than the polymer having crystallinity (such as those described below) either within the voids or at the interface of the voids.

The antioxidant may be any antioxidant suitably selected depending on the desired purpose. For example, a known hindered phenol may be added. Among such hindered phenols are antioxidants marketed under the trade names of IRGANOX 1010, SMILIZER BHT and SMILIZER GA-80.

The antioxidant may be used as a primary antioxidant in conjunction with a secondary antioxidant. Examples of secondary antioxidants include antioxidants marketed under the trade names of SMILIZER TPL-R, SMILIZER TPM and SMILIZER TP-D.

<Void>

The void-containing resin molded product of the present invention contains elongated voids whose longitudinal directions are aligned in one direction. The elongated voids are characteristic in their aspect ratio.

The term "void" as used herein means a vacuum domain or a gas phase domain present within the resin molded product.

The aspect ratio is a ratio defined as L/r, where L denotes an average length of the voids (in μm) in a direction in which the voids are aligned, and r denotes an average length of the voids (in μm) in a thickness direction which is perpendicular to the direction in which the voids are aligned.

The aspect ratio may take any value as long as the advantageous effects of the present invention are not impaired. Such an aspect ratio may be suitably selected depending on the desired purpose and is preferably 10 or greater, more preferably 15 or greater, still more preferably 20 or greater.

Figure 2A:
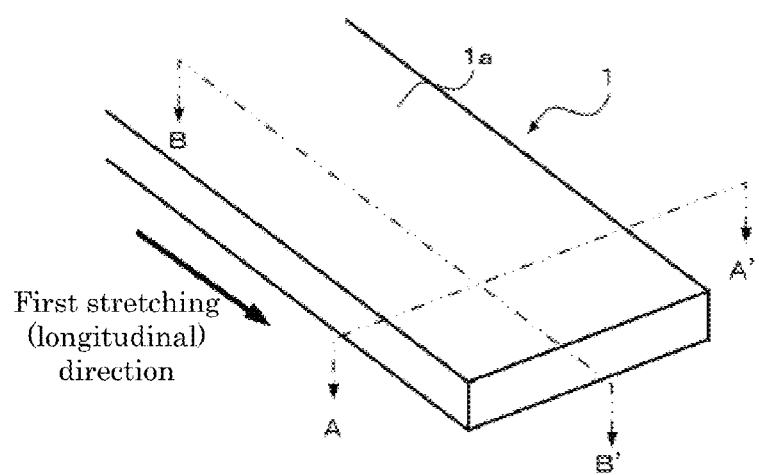
FIG. 2A is a perspective view of a void-containing resin molded product, which is used as describing the aspect ratio of the molded product in detail.
Figure 2B:
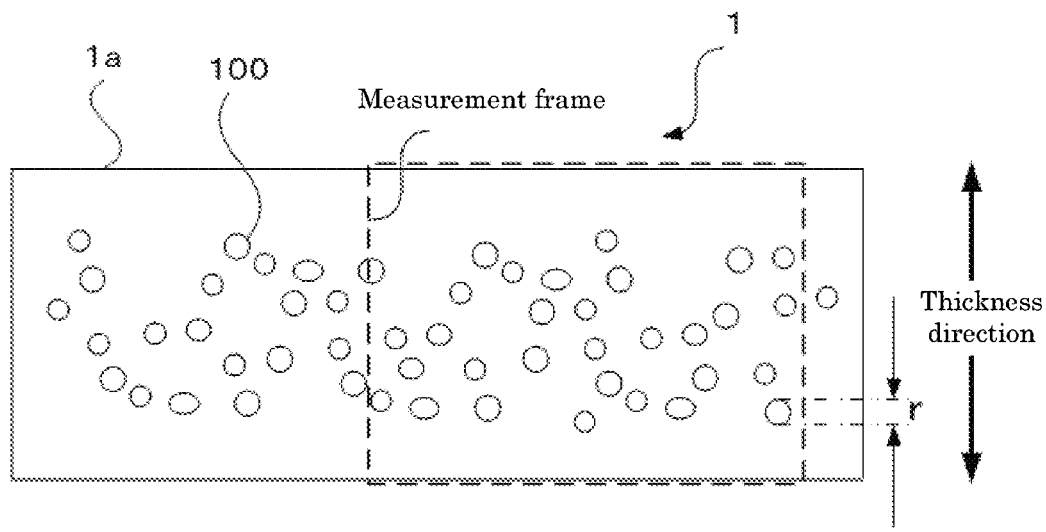
FIG. 2B is a cross-sectional view of the void-containing resin molded product of FIG. 2A taken along line A-A', which is used for describing the aspect ratio of the molded product in detail.
Figure 2C:
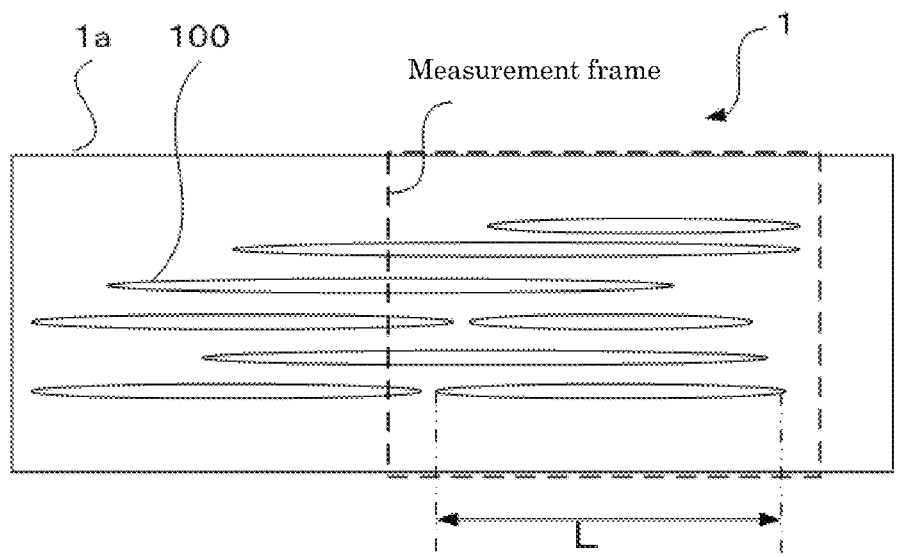
FIG. 2C is a cross-sectional view of the void-containing resin molded product of FIG. 2A taken along line B-B', which is used for describing the aspect ratio of the molded product in detail.

FIGS. 2A to 2C each are used for describing the aspect ratio in detail, with FIG. 2A being a perspective view of a void-containing resin molded product, FIG. 2B being a cross-sectional view of the void-containing resin molded product of FIG. 2A taken along line A-A', and FIG. 2C is a cross-sectional view of the void-containing resin molded product of FIG. 2A taken along line B-B'.

During the production process of void-containing resin molded products, the voids are generally aligned along a first stretching direction. Thus, what is meant by "average length of the voids (r) (in μm) in a thickness direction which is perpendicular to a direction in which the voids are aligned" corresponds to the average thickness r of voids 100 (see FIG. 2B) as viewed in a cross-section that is perpendicular to the surface 1a of the void-containing resin molded product 1 and perpendicular to the first stretching direction (cross-section taken along line A-A' of FIG. 2A). Likewise, what is meant by "average length of voids (L) (in μm) in a direction in which the voids are aligned" corresponds to the average L of voids 100 (see FIG. 2C) as viewed in a cross-section that is perpendicular to the surface of the void-containing resin molded product and parallel to the first stretching direction (cross-section taken along line B-B' of FIG. 2A).

When the void-containing resin molded product is stretched only in one direction, the first stretching direction refers to that direction. In general, the resin molded product is stretched longitudinally along the direction of its flow. Thus, the first stretching direction typically corresponds to this longitudinal stretching direction.

When the void-containing resin molded product is stretched in two or more directions, the first stretching direction refers to at least one direction in which the resin molded product is stretched in order to form voids. In general, when the resin molded product is stretched in two or more directions, the resin molded product is also stretched longitudinally along the direction in which the resin molded product flows during the production. Since voids are formed by this longitudinal stretching, the first stretching direction corresponds to this longitudinal stretching direction.

Here, the aspect ratio can be measured based on an image obtained using an optical or electronic microscope.

Also, the void-containing resin molded product of the present invention is characterized by an average number (P) of the voids in a thickness direction perpendicular to a direction in which the voids are aligned, the difference in refractive index (ΔN) between the void-containing layer and the layer of the polymer having crystallinity, and a product of ΔN and P.

The average number P of the voids in a thickness direction perpendicular to a direction in which the voids are aligned is not particularly limited, so long as the effects of the present invention are not impaired, and may be appropriately selected depending on the purpose. It is preferably 5 or more, more preferably 10 or more, still more preferably 15 or more.

During the production process of the void-containing resin molded product, the voids are generally aligned along the first stretching direction. Thus, what is meant by "number of the voids in a thickness direction perpendicular to a direction in which the voids are aligned" corresponds to the number of voids 100 in a thickness direction, as viewed in a cross-section that is perpendicular to the surface 1a of the void-containing resin molded product 1 and is perpendicular to the first stretching direction (cross-section taken along line A-A' of FIG. 2A).

Here, the average number P of the voids in a thickness direction perpendicular to a direction in which the voids are aligned can be measured based on an image obtained using an optical or electronic microscope.

The difference ΔN in refractive index between the void-containing layer and the layer of the polymer having crystallinity specifically refers to the difference ΔN between N1 and N2 (=N1−N2), where N1 denotes a refractive index of the layer of the polymer having crystallinity with respect to light having a wavelength of 400 nm to 800 nm, and N2 denotes a refractive index of the void-containing layer with respect to the same light.

Here, the refractive index N1 of the layer of the polymer having crystallinity and the refractive index N2 of the void-containing layer can be measured with an Abbe refractometer.

The product of ΔN and P is not particularly limited, so long as the effects of the present invention are not impaired, and may be appropriately selected depending on the purpose. It is preferably 3 or more, more preferably 5 or more, still more preferably 7 or more.

The void-containing resin molded product contains voids as described above and thus, has various excellent properties such as reflectivity, glossiness and transmittance. In addition, the void-containing resin molded product may be changed in properties such as reflectivity, glossiness and transmittance, by changing the voids in shape, number, etc.

—Glossiness—

The glossiness is that defined in JIS Z8741.

The glossiness of the void-containing resin molded product is not particularly limited and may be appropriately selected depending on the purpose. It is preferably 60 or higher, more preferably 70 or higher, still more preferably 80 or more, as measured when light having a wavelength of 400 nm to 800 nm is applied at an incident angle of 60° or less.

Here, the glossiness can be measured with a variable angle glossimeter.

—Transmittance—

The transmittance refers to a value of intensity of transmitted light/intensity of incident light×100(%), as obtained when light having a predetermined wavelength is applied perpendicularly to a surface of the void-containing resin molded product.

The transmittance of the void-containing resin molded product with respect to light having a wavelength of 400 nm to 800 nm is not particularly limited, so long as the effects of the present invention are not impaired, and may be appropriately selected depending on the purpose. It is preferably 20% or less, more preferably 15% or less, still more preferably 10% or less.

Alternatively, a suitable transmittance of the void-containing resin molded product may be defined as a relative value; i.e., M/N, where M (%) denotes a transmittance of the void-containing resin molded product with respect to light having a wavelength of 400 nm to 800 nm, and N (%) denotes a transmittance of a void-free polymer molded product, with respect to the same light, having the same thickness as the void-containing resin molded product and consisting of the same polymer having crystallinity as in the void-containing resin molded product. The ratio M/N is preferably 0.2 or less, more preferably 0.18 or less, still more preferably 0.15 or less.

Here, the transmittance can be measured with a spectrophotometer.

Also, the void-containing resin molded product has high surface smoothness since it is free of inorganic fine particles, incompatible resins, inert gases and other components for forming voids.

While the void-containing resin molded product may have any surface smoothness that is suitably selected depending on the desired purpose, it preferably has a surface smoothness Ra of 0.3 μm or less, more preferably 0.25 μm or less, particularly preferably 0.1 μm or less.

Furthermore, the void-containing resin molded product is characterized in that it contains no voids not only in the film surface but also in a region from the film surface to a predetermined depth.

Specifically, in a cross-section of the void-containing resin molded product that is perpendicular to a direction in which the voids are aligned, the expression h(avg)>T/100 is satisfied, where h(avg) denotes an arithmetic average of h(i)s which each denote a distance from a surface of the void-containing resin molded product to a center of each of 10 voids whose centers are closer to the surface of the void-containing resin molded product than are centers of any other voids; and T denotes an arithmetic average thickness of the cross-section, the 10 voids being selected from voids in a region defined by one straight line parallel to the thickness direction and another straight line parallel to and distant by 20×T from the one straight line.

The term "center of a void" refers to a center of the void, when the void has a perfectly circular cross-section in the cross-section of the void-containing resin molded product that is perpendicular to a direction in which the voids are aligned. In other cases, for example, this term refers to a center calculated by the minimum squares circle method so that the sum of squares of deviations from a randomly determined reference circle is minimized.

The term "surface of the void-containing resin molded product" refers to the outermost surface of the void-containing resin molded product in a thickness direction. In general, this term refers to the top surface of the void-containing resin molded product flatly placed.

Figure 2D:
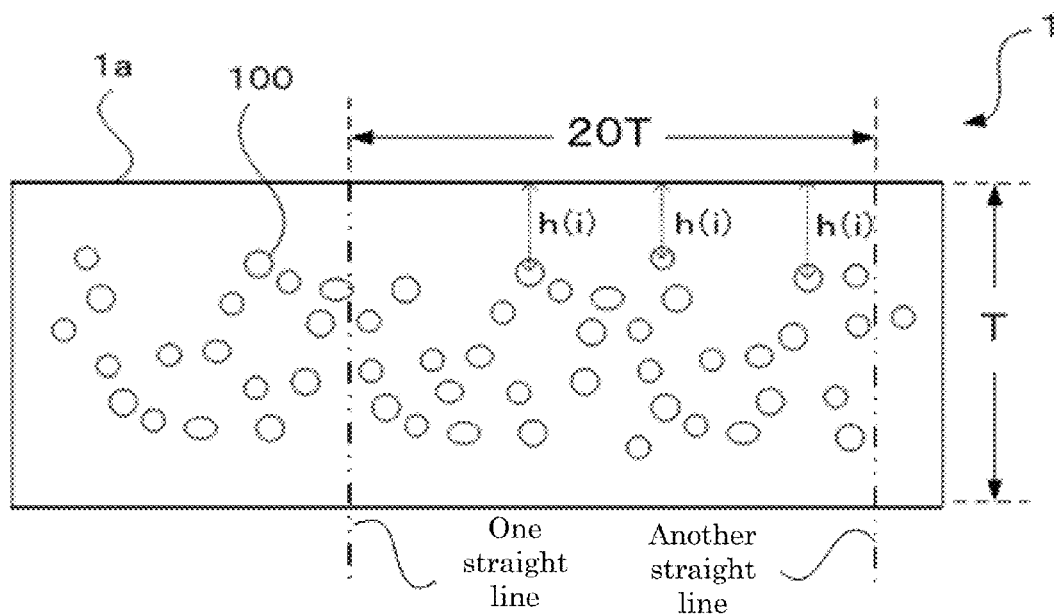
FIG. 2D is a cross-sectional view of the void-containing resin molded product of FIG. 2A taken along line A-A', which is used for describing a method for measuring the distances from the film surface to 10 closest voids to the film surface.

Specifically, a cross-section of the void-containing resin molded product which is perpendicular to the surface of the void-containing resin molded product and to the longitudinally stretching direction (see FIG. 2D) is observed under a scanning electron microscope at a suitable magnification of ×300 to ×3,000, and then photographed to obtain a cross-sectional photograph. Using this cross-sectional photograph, an arithmetic average thickness T is calculated. The arithmetic average thickness T may be a thickness measured with a long-range contact-type displacement sensor.

Next, in the cross-sectional photograph, one straight line is drawn in parallel with a thickness direction, and then another straight line parallel to and distant by 20×T from the one straight line is drawn.

Then, with respect to each void in the cross-sectional photograph, its center is calculated by the minimum squares circle method so that the sum of squares of deviations from a randomly determined reference circle is minimized, and is defined as a center of the void.

Subsequently, 10 voids whose centers are closer to the surface of the void-containing resin molded product than are centers of any other voids; i.e., the distances from the centers of the voids to the surface of the void-containing resin molded product are shorter than those from the centers of any other voids to the surface of the void-containing resin molded product, are selected from a region defined by the one straight line and the another straight line. Notably, the "distance from a center of a void to a surface of the void-containing resin molded product" refers to a radius of a circle whose center is the void's center and which is in contact with the surface of the void-containing resin molded product. Specifically, the circle is drawn by gradually increasing a radius thereof.

Thereafter, for the selected 10 voids, the distance h(i) from each center to the surface of the void-containing resin molded product is calculated. Then, an arithmetic average h(avg) of the obtained h(i)s is calculated using equation (1):

$$h(\text{avg}) = (\Sigma h(i))/10 \qquad (1)$$

Notably, the "distance h(i) from each center to the surface of the void-containing resin molded product" cannot accurately measured when the void-containing resin molded product is curved or stressed. Preferably, the void-containing resin molded product is flatly placed during measurement.

Also, the void-containing resin molded product has high surface smoothness since it contains no voids in the vicinity of the surface of the void-containing resin molded product.

(Production Method of Void-containing resin molded product)

One method of producing the void-containing resin molded product includes at least the step of stretching a polymer molded product and other optional steps, such as film-forming step.

The above-described polymer molded product refers to a void-free molded product consisting of the above-described polymer having crystallinity. Examples of the polymer molded products include polymer films and polymer sheets.

—Stretching Step—

In the stretching step, the polymer molded product is stretched at least monoaxially. As the polymer molded product is stretched, voids aligned along the first stretching direction are formed within the polymer molded product. As a result, a void-containing resin molded product can be obtained.

One reason why the voids are formed by stretching the polymer molded product is believed to be that at least one of the polymers having crystallinity that form the polymer molded product is composed of different states of crystals, including a phase containing crystals that can hardly be stretched during stretching of the polymer molded product, such that the resin between the hard crystals is torn as the polymer molded product is stretched, providing the source of voids.

The formation of voids by stretching can occur not only in a polymer molded product composed of one polymer having crystallinity, but also in a polymer molded product composed of two or more polymers having crystallinity that are blended or copolymerized together.

The polymer molded product can be stretched by any technique as long as the advantageous effects of the present invention are not impaired. Examples of such techniques include monoaxial stretching, successive biaxial stretching and simultaneous biaxial stretching. Regardless of the type of stretching technique used, it is preferred that the polymer molded product be stretched longitudinally along the direction in which the molded product flows during the production process.

In general, the number of stretching steps and the stretching speed during longitudinal stretching can be adjusted by changing the combination of rolls and the difference in speed among rolls.

While the longitudinal stretching may be carried out in any number of steps (i.e., one or more steps), it is preferred that the polymer molded product be longitudinally stretched in two or more steps in order to ensure stable, high-speed stretching and also in view of the production yield and the limitations of the stretching machine. The stretching carried out in more than two steps is also advantageous in that the occurrence of necking can be confirmed in the first step prior to the stretching in the second step for forming voids.

—Stretching Speed—

The longitudinal stretching may be carried out at any speed as long as the advantageous effects of the present invention are not impaired. While such a speed may be suitably selected depending on the desired purpose, it is preferably from 10 mm/min to 36,000 mm/min, more preferably from 800 mm/min to 24,000 mm/min, still more preferably from 1,200 mm/min to 12,000 mm/min. The stretching speeds of 10 mm/min to 36,000 mm/min are preferred since not only can sufficient necking occur at such a speed, but the polymer molded product can also be stretched uniformly, so that the resin is less likely to tear and cost reduction is possible since large stretching apparatuses intended for high-speed stretching are not necessary.

More specifically, the stretching speed is preferably from 1,000 mm/min to 36,000 mm/min, more preferably from 1,100 mm/min to 24,000 mm/min, still more preferably from 1,200 mm/min to 12,000 mm/min for the single step stretching.

For the two-step stretching, the first stretching step preferably serves as a preparatory stretching step intended primarily for the purpose of inducing necking. The stretching speed of preparatory stretching is preferably from 10 mm/min to 300 mm/min, more preferably from 40 mm/min to 220 mm/min, still more preferably from 70 mm/min to 150 mm/min.

In the two-step stretching, the stretching speed of the second stretching step following the preparatory stretching (i.e., first stretching step) for inducing necking preferably differs from the stretching speed of the preparatory stretching. The stretching speed of the second stretching step after necking has been induced in the preparatory stretching is preferably from 600 mm/min to 36,000 mm/min, more preferably from 800 mm/min to 24,000 mm/min, still more preferably from 1,200 mm/min to 15,000 mm/min.

—Stretching Temperature—

While the polymer molded product may be stretched at any temperature suitably selected depending on the desired purpose, it is preferably stretched at a stretching temperature T (° C.) which falls within the following range:

$$(Tg-30)(°\,C.) \leq T(°\,C.) \leq (Tg+50)(°\,C.),$$

more preferably at a stretching temperature T (° C.) which falls within the following range:

$$(Tg-25)(°\,C.) \leq T(°\,C.) \leq (Tg+45)(°\,C.),$$

still more preferably at a stretching temperature T (° C.) which falls within the following range:

$$(Tg-20)(°\,C.) \leq T(°\,C.) \leq (Tg+40)(°\,C.)$$

where Tg denotes a glass transition temperature (° C.).

In general, a higher stretching temperature (° C.) results in a lower stretch tension, thus allowing the polymer molded product to be more easily stretched. However, a stretching temperature (° C.) that is equal to or higher than {glass transition temperature (Tg)−30}° C. but is equal to or lower than {glass transition temperature (Tg)+50}° C. is preferred since the void content is increased and voids having an aspect ratio of 10 or higher are likely to be formed in this temperature range, ensuring sufficient formation of voids.

The stretching temperature T (° C.) can be measured by a non-contact thermometer. The glass transition temperature Tg (° C.) can be measured by a differential scanning calorimeter (DSC).

During the stretching step, the polymer molded product may or may not be stretched in a transverse direction as long as the formation of voids is not hindered. The transverse stretching may be used to relax or thermally treat the film.

Once stretched, the void-containing resin molded product may be subjected to various treatments for the purpose of, for example, stabilizing its shape. For example, the void-containing resin molded product may be subjected to a heat treatment to cause thermal shrinkage or it may be treated to impart tension.

The polymer molded product may be produced by any suitable technique selected depending on the desired purpose. For example, it can be suitably produced by a melt film-forming process when the polymer having crystallinity is a polyester resin.

The production of the polymer molded product may be carried out independently of the above-described stretching step or may be sequentially carried out subsequent thereto.

FIG. 1 is a flow diagram of a biaxial stretching film-forming apparatus, showing one example of a production method of void-formed resin molded products of the present invention.

As shown in FIG. 1, a raw resin material 11 is heat-melted and kneaded in an extruder 12 (either a biaxial extruder or a monoaxial extruder may be used depending on the form of the material and on the production scale) and then discharged from a T-die 13 in the form of a soft plate (a film or sheet).

The discharged film or sheet F is cooled and solidified on a casting roll 14 to form a film. The resulting film or sheet F (i.e., polymer molded product) is sent to a longitudinal stretcher 15.

The film or sheet F is heated again in the longitudinal stretcher 15 and stretched longitudinally between rolls 15a being driven at different speeds. This longitudinal stretching results in void formation in the film or sheet F along the stretching direction. Subsequently, the film or sheet F having voids formed therein is stretched transversely as it travels in a transverse stretcher 16 to a winder (not shown) with its sides gripped by clips 16a arranged at either side of the transverse stretcher 16. This gives a void-formed resin molded product 1. In the above-described process, the longitudinally stretched film or sheet F may not be stretched with the traverse stretcher 16 and may directly be used as the void-formed resin molded product 1.

<Applications>

The void-containing resin molded product of the present invention exhibits high reflectivity by virtue of voids, as well as has high surface smoothness. Thus, it can be utilized as a reflective plate used in, for example, illumination members of electronic devices, illumination members for household use, and inner lighting sign boards.

(Reflective Plate)

A reflective plate of the present invention includes the above-described void-containing resin molded product; and if necessary, includes other layers.

The reflective plate exhibits excellent reflectivity since it contains the above-described void-containing resin molded product.

EXAMPLES

The present invention will next be described in more detail by way of examples, which should not be construed as limiting the present invention thereto. It should be appreciated that various changes may be made to the present invention without departing from the spirit of the previous and the following description, and that any of such changes falls within the scope of the present invention.

First Example

In First Example, (void-containing) resin films that meet the requirements of the present invention (Examples 1 to 5) and resin films that do not meet the requirements of the present invention (Comparative Examples 1 to 3) are prepared and evaluated for their characteristics.

Example 1

PBT1, a resin composed of polybutylene terephthalate only (100%) and having an IV of 0.72, was extruded from a T-die of a melt extruder at 245° C. and solidified on a casting drum to obtain a polymer film having a thickness of approximately 120 μm. The resulting polymer film was monoaxially (longitudinally) stretched.

Specifically, the polymer film was stretched monoaxially at a speed of 100 mm/min in an atmosphere maintained at 40° C. to induce necking. Once the occurrence of necking was confirmed, the polymer film was further monoaxially stretched in the same direction at a speed of 6,000 mm/min.

Example 2

PBT2, a resin composed of polybutylene terephthalate only (100%) and having an IV of 0.86, was extruded from a T-die of a melt extruder at 250° C. and solidified on a casting drum to obtain a polymer film having a thickness of approximately 80 μm. The resulting polymer film was monoaxially (longitudinally) stretched.

Specifically, the polymer film was stretched monoaxially in a single step at a speed of 48,000 mm/min in an atmosphere maintained at 40° C.

Example 3

PBT1 used in Example 1 and PET having an IV of 0.67 (product of Fuji Photo Film Co., Ltd.) were mixed together at a ratio of 90:10 (=PBT1:PET). The mixture was extruded from a T-die of a melt extruder at 285° C. and solidified on a casting drum to obtain a polymer film having a thickness of approximately 55 μm. The resulting polymer film was monoaxially (longitudinally) stretched.

Specifically, the procedure of Example 1 was repeated, except that the PBT1 resin was changed to the above mixture of PBT1 and PET, that the stretching temperature was changed from 40° C. to 60° C., and that the second longitudinal stretching speed was changed from 6,000 mm/min to 4,000 mm/min, to thereby prepare a resin film.

Example 4

A resin film was prepared in the same manner as in Example 1, except that the stretching temperature was changed to 30° C., that the thickness of a polymer film was approximately 50 μm, and that the second longitudinal stretching speed was changed from 6,000 mm/min to 12,000 mm/min.

Example 5

Isotactic polypropylene (polypropylene 100% resin, product of Aldrich Co., weight average molecular weight: 190,000, number average molecular weight: 50,000, MFI: 35 g/10 min (ASTM D1238, 230° C.·2.16 kg), Tm: 170° C. to 175° C.) was extruded from a T-die of a melt extruder at 210° C. and solidified on a casting drum to obtain a polymer film having a thickness of approximately 150 μm. The resulting polymer film was monoaxially (longitudinally) stretched.

Specifically, the polymer film was stretched monoaxially at a speed of 12,000 mm/min in an atmosphere maintained at 35° C. in a single step.

Comparative Example 1

A resin film was prepared in the same manner as in Example 1, except that the polymer film was stretched at 5° C., rather than 40° C.

In Comparative Example 1, the polymer film tore immediately after the first longitudinal stretching step was started.

Comparative Example 2

A resin film was prepared in the same manner as in Example 1, except that the polymer film was stretched at 100° C., rather than 40° C.

In Comparative Example 2, the occurrence of necking was not observed after the first longitudinal stretching step, nor were any voids formed in the second stretching step.

Comparative Example 3

A resin film was prepared in the same manner as in Example 1, except that the speed of longitudinal stretching in the first stretching step was 40,000 mm/min, rather than 100 mm/min.

In Comparative Example 3, the polymer film tore immediately after the first longitudinal stretching step was started.

The resin films produced in Examples 1 to 5 and Comparative Examples 1 to 3 are collectively shown in Table 1.

blank value obtained in the case where no resin film was used. The wavelength of the light applied was 550 nm, 420 nm or 780 nm.

(2) Measurement of Glossiness

Using variable angle glossimeter VG-1001DP (trade name) (product of NIPPON DENSHOKU INDUSTRIES CO., LTD.), light having a wavelength of 400 nm to 800 nm was applied at an incident angle of 60° (light-receiving angle: 60°) for measuring glossiness.

(3) Measurement of Thickness

The thickness was measured using a long-range contact-type displacement sensor including AF030 (detector unit) and AF350 (indicator unit) (product of KEYENCE CORPORATION).

(4) Measurement of Surface Smoothness

The surface smoothness was measured on NewView 5022 interferometer (Zygo) for three-dimensional profiling at an objective magnification of ×50.

(5) Measurement of Aspect Ratio

A cross-section perpendicular both to the surface of each resin film and to the direction of longitudinal stretching (see FIG. 2B) and a cross-section perpendicular to the surface of the resin film and parallel to the direction of longitudinal stretching (see FIG. 2C) were observed by a scanning electron microscope at a suitable magnification between ×300 to ×3,000. A measurement frame was selected in each cross-sectional photograph so that 50 to 100 voids were contained in the frame. The longitudinal alignment of voids was also confirmed through observation with a scanning electron microscope.

The number of voids contained in each measurement frame was counted: the number of voids contained in a given measurement frame in a cross-section perpendicular to the longitudinal stretching direction (see FIG. 2B) was designated "m" and the number of voids contained in a given measurement

TABLE 1

| | | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|
| Material | Resins | PBT1 | PBT2 | PBT1/PET (90/10) (% by mass) | PBT1 | Isotactic polypropylene | PBT1 | PBT1 | PBT1 |
| | Tg (° C.) | 39 | 39 | 39/72 | 39 | −13 | 39 | 39 | 39 |
| | IV | 0.72 | 0.86 | 0.72/0.6 | 0.72 | N/A | 0.72 | 0.72 | 0.72 |
| | Tm (° C.) | 228 | 228 | 228/268 | 228 | 170-175 | 228 | 228 | 228 |
| Polymer film | Thickness (μm) | 120 | 80 | 55 | 50 | 150 | 30 | 130 | 80 |
| Stretch | First stretching speed (mm/min) | 100 | 4,800 | 100 | 100 | 12,000 | 100 | 100 | 40,000 |
| | Second stretching speed (mm/min) | 6,000 | — | 4,000 | 12,000 | — | — | 6,000 | — |
| | Stretching temp. (° C.) | 40 | 40 | 60 | 30 | 35 | 5 | 100 | 40 |

—Evaluation—

The resin films of Examples 1 to 5 and Comparative Examples 1 to 3 were evaluated as follows.

(1) Measurement of Transmittance

The transmittance was measured using spectrophotometer U-4100 (product of Hitachi Ltd.). Light was applied to the resin film surface perpendicularly thereto, and the intensity of light transmitted through the resin film was compared with a frame in a cross-section parallel to the longitudinal stretching direction (see FIG. 2C) was designated "n."

The thickness ($r_i$) of each void contained in the measurement frame in the cross-section perpendicular to the longitudinal stretching direction (see FIG. 2B) was then measured and the average thickness was designated "r." The length ($L_i$) of each void contained in the measurement frame in the cross-section parallel to the longitudinal stretching direction (see FIG. 2C) was also measured and the average length was designated "L."

Thus, r and L can be expressed by the following equations (2) and (3), respectively:

$$r = (\Sigma r_i)/m \quad (2)$$

$$L = (\Sigma L_i)/n \quad (3)$$

The aspect ratio can then be determined as L/r.

(6) Average Number P of Voids in a Thickness Direction Perpendicular to a Direction in which the Voids are Aligned First, a cross-section of each resin film, perpendicular to its surface and to the longitudinal stretching direction was photographed with a scanning electron microscope. Also, through observation under the scanning electron microscope, it was confirmed that the voids were aligned in the longitudinal stretching direction.

Then, 20 straight lines were drawn on the cross-sectional photograph in a thickness direction (from the bottom surface of the film to the top surface thereof). The number of voids in contact with each straight line was counted, and an average number of the voids was obtained.

(7) Difference ΔN in Refractive Index Between Void-Containing Layer and Layer of Polymer Having Crystallinity The refractive index N1 of the layer of the polymer having crystallinity was measured with an Abbe refractometer using a transparent film which had separately prepared from the same polymer through extrusion molding.

The refractive index N2 of the void-containing layer was determined to be 1; i.e., the refractive index of air. This is because, when the void-containing film was cut in water, the formed bubbles were found to be air through analysis. Then, the difference ΔN (=N1−N2) was calculated between the refractive index N1 of the layer of the polymer having crystallinity and the refractive index N2 of the void-containing layer. The refractive indices N1 and N2 were measured with respect to light having a wavelength of 589 nm.

(8) Measurement of Distance from Film Surface to Closest Void to the Film Surface The cross-section of the resin film (see FIG. 2D), perpendicular to the surface of the resin film and to the longitudinal stretching direction, was observed under a scanning electron microscope at a suitable magnification of ×300 to ×3,000, and then photographed to obtain a cross-sectional photograph. In photographing, the resin film was flatly set on the scanning electron microscope.

Using this cross-sectional photograph, an arithmetic average thickness T was calculated. In each resin film, the arithmetic average thickness T thus calculated was found to be equal to the thickness measured in the above "(3) Measurement of thickness" (see Table 2).

Next, in the cross-sectional photograph, one straight line was drawn in parallel with a thickness direction, and then another straight line parallel to and distant by 20×T from the one straight line was drawn. Also, through observation under the scanning electron microscope, it was confirmed that the voids were aligned in the longitudinal stretching direction.

Then, with respect to each void in the cross-sectional photograph, its center was calculated by the minimum squares circle method so that the sum of squares of deviations from a randomly determined reference circle was minimized, and was defined as a center of the void.

Subsequently, 10 voids whose centers were closer to the top surface of the resin film than were centers of any other voids were selected from a region defined by the one straight line and the another straight line. Notably, the "distance from a center of a void to the top surface of the resin film" refers to a radius of a circle whose center was the void's center and which was in contact with the surface of the resin film. Specifically, the circle was drawn by gradually increasing a radius thereof.

Thereafter, for the selected 10 voids, the distance h(i) from each center to the surface of the resin film was calculated. Then, an arithmetic average h(avg) of the obtained h(i)s was calculated using equation (1):

$$h(avg) = (\Sigma h(i))/10 \quad (1)$$

Table 2 collectively shows evaluation results.

TABLE 2

| | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Appearance of stretched film | Opaque | Opaque | Opaque | Opaque | Opaque | Torn | Transparent | Torn |
| Thickness of stretched film (μm) | 80 | 50 | 30 | 30 | 50 | — | 41 | — |
| Transmittance $M_{550}$ (%) of stretched film to light of 550 nm | 7.8 | 12.2 | 15.8 | 7.0 | 6.0 | — | 83.5 | — |
| Transmittance $N_{550}$ (%) of polymer film having the same thickness as stretched film to light of 550 nm | 87.0 | 87.0 | 88.0 | 88.0 | 90.0 | — | 87.0 | — |
| $M_{550}/N_{550}$ | 0.09 | 0.14 | 0.18 | 0.08 | 0.066 | — | 0.96 | — |
| Transmittance $M_{420}$ (%) of stretched film to light of 420 nm | 7.8 | 12.2 | 15.8 | 7.0 | 6.0 | — | 83.5 | — |
| Transmittance $N_{420}$ (%) of polymer film having the same thickness as stretched film to light of 420 nm | 87.0 | 85.0 | 86.0 | 86.0 | 87.0 | — | 87.0 | — |
| $M_{420}/N_{420}$ | 0.09 | 0.14 | 0.18 | 0.08 | 0.066 | — | 0.96 | — |
| Transmittance $M_{780}$ (%) of stretched film to light of 780 nm | 7.8 | 12.2 | 15.8 | 7.0 | 6.0 | — | 83.5 | — |
| Transmittance $N_{780}$ (%) of polymer film having the same thickness as stretched film to light of 780 nm | 87.0 | 88.0 | 89.0 | 89.0 | 91.0 | — | 87.0 | — |

TABLE 2-continued

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| $M_{780}/N_{780}$ | 0.09 | 0.14 | 0.18 | 0.08 | 0.066 | — | 0.96 | — |
| Surface smoothness (Ra) | 0.08 | 0.09 | 0.08 | 0.08 | 0.08 | — | 0.08 | — |
| Glossiness | 125 | 120 | 123 | 128 | 140 | — | 160 | — |
| Avg. thickness r of voids (μm) | 0.83 | 0.62 | 0.62 | 0.76 | 0.54 | — | No voids | — |
| Avg. thickness L of voids (μm) | 12.5 | 18.9 | 14.3 | 22.2 | 31.0 | — | No voids | — |
| L/r | 15 | 12 | 23 | 30 | 57 | — | — | — |
| P | 25 | 10 | 17 | 28 | 30 | — | 0 | — |
| ΔN × P | 13.75 | 5.5 | 9.35 | 15.4 | 14.1 | — | 0 | — |
| h(avg) | 7.1 | 2.9 | 8.1 | 0.7 | 1.4 | — | — | — |

From the results of First Example, it was found that only the resin films of Examples 1 to 5 effectively shielded light and exhibited excellent reflectivity and glossiness.

Second Example

In Second Example, the resin films prepared in First Example (Examples 1 to 5 and Comparative Examples 2) were measured for reflectivity.

Figure 3:
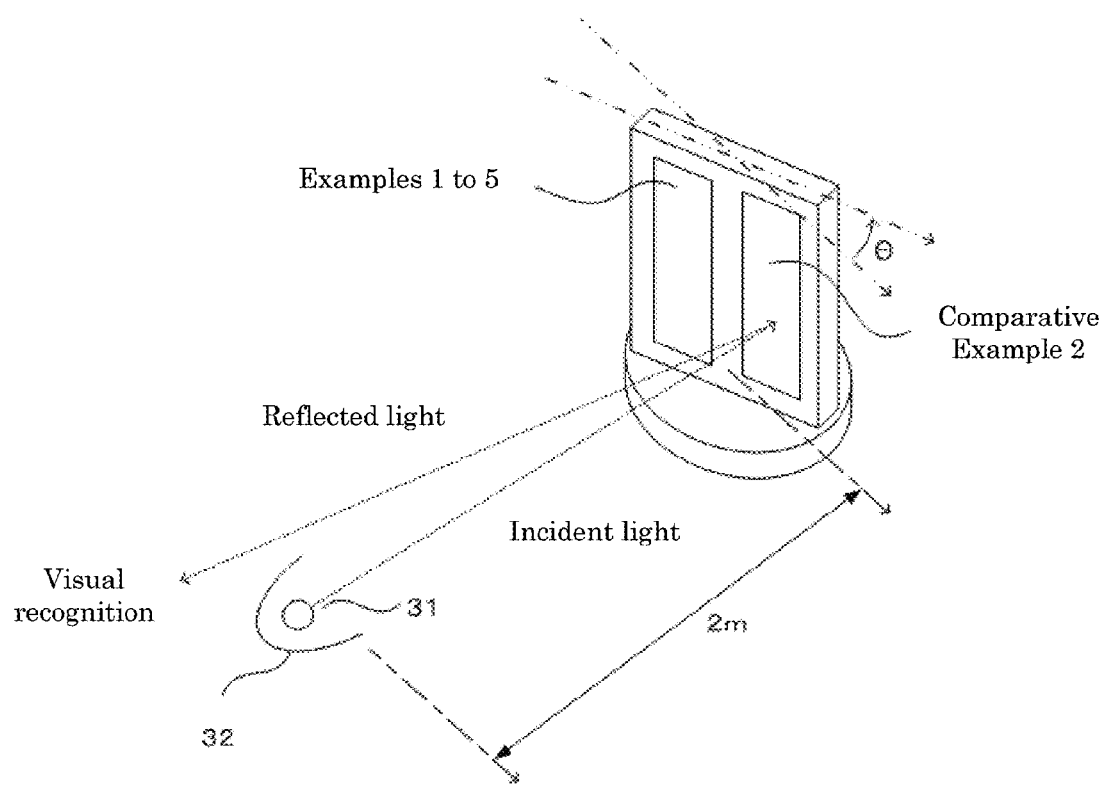
FIG. 3 is an illustration for describing a measurement method of reflectivity employed in Second Example.

FIG. 3 is an illustration for describing a measurement method of reflectivity employed in Second Example.

As shown in FIG. 3, in darkness, light from a white light source 31 (0.75 W) was converged with a reflecting mirror 32 so that a circular light spot having a diameter of 20 cm was formed at a position distant by 2m from the light source. Then, the resin film of Comparative Example 2 was perpendicularly set at the position. Further, the resin films of Examples 1 to 5 were sequentially set at a position adjacent to and on the same surface as the position where the resin film of Comparative Example 2 was placed.

Then, an angle at which the resin film surface faced the white light source 31 was defined as 0° (θ=0°), and the resin film was gradually moved so that the angle was 30° (θ=30°), 45° (θ=45°) and 60° (θ=60°). In each angle, the reflected light was visually observed from the position where the light source was placed.

As a result, the transparent resin film of Comparative Example 2 was visually recognized only at 0°; i.e., was not visually recognized at 30°, 45° or 60°.

In contrast, the resin films of Examples 1 to 5 were visually recognized at all the angles.

The invention claimed is:

1. A void-containing resin molded product consisting of: a single polymer having crystallinity, which is free of incompatible resins,
   wherein the void-containing resin molded product has elongated voids whose longitudinal directions are aligned in one direction,
   wherein the elongated voids satisfy the expression h(avg)>T/100, where h(avg) denotes an arithmetic average of h(i)s which each denote a distance from a surface of the void-containing resin molded product to a center of each of 10 voids whose centers are closer to the surface of the void-containing resin molded product than are centers of any other voids in a cross-section of the void-containing resin molded product that is perpendicular to a direction in which the voids are aligned, the 10 voids being selected from voids in a region defined by one straight line which is parallel to a thickness direction of the void-containing resin molded product and another straight line which is parallel to and distant by 20×T from the one straight line; and T denotes an arithmetic average thickness of the cross-section,
   wherein the elongated voids have a ratio L/r of 10 or more, where L denotes an average length of the voids (in μm) in the direction in which the voids are aligned, and r denotes an average length of the voids (in μm) in the thickness direction which is perpendicular to the direction in which the voids are aligned, and
   wherein the void-containing resin molded product has a glossiness of 50 or higher, and has a ratio M/N of 0.2 or less, where M denotes a transmittance (%) of the void-containing resin molded product with respect to light having a wavelength of 400nm to 800nm, and N denotes a transmittance (%) of a void-free polymer molded product, with respect to the same light, having the same thickness as the void-containing resin molded product and consisting of the same polymer that forms the void-containing resin molded product.

2. The void-containing resin molded product according to claim 1, wherein the void-containing resin molded product satisfies a product of ΔN and P of 3 or more, where P denotes an average number of the voids in the thickness direction that is perpendicular to the direction in which the voids are aligned, ΔN denotes a difference between N1 and N2 (=N1-N2), where N1 denotes a refractive index of a layer of the polymer with respect to light having a wavelength of 400nm to 800nm, and N2 denotes a refractive index of a void-containing layer with respect to the same light.

3. The void-containing resin molded product according to claim 1, wherein the single polymer having crystallinity is any one of a polyester, a polyolefin, or a polyamide.

4. The void-containing resin molded product according to claim 1, wherein the voids are formed by stretching the single polymer having crystallinity at a speed of 10mm/min to 36,000mm/min and at a stretching temperature T(° C.) which falls within the following range:

(Tg−30)(° C.)≦T(° C.)≦(Tg+50)(° C.)

where Tg denotes a glass transition temperature (° C.) of the polymer having crystallinity.

5. A reflective plate comprising:
a void-containing resin molded product which consists of a single polymer having crystallinity, which is free of incompatible resins, and has elongated voids whose longitudinal directions are aligned in one direction,
wherein the elongated voids satisfy the expression h(avg)>T/100, where h(avg) denotes an arithmetic average of h(i)s which each denote a distance from a surface of the void-containing resin molded product to a center of each of 10 voids whose centers are closer to the surface of the void-containing resin molded product than are centers of any other voids in a cross-section of the void-containing resin molded product that is perpendicular to a direction in which the voids are aligned, the 10 voids being selected from voids in a region defined by one straight line which is parallel to a thickness direction of the void-containing resin molded product and another straight line which is parallel to and distant by 20×T from the one straight line; and T denotes an arithmetic average thickness of the cross-section, wherein the elongated voids have a ratio L/r of 10 or more, where L denotes an average length of the voids (in μm) in the direction in which the voids are aligned, and r denotes an average length of the voids (in μm) in the thickness direction which is perpendicular to the direction in which the voids are aligned, and wherein the void-containing resin molded product has a glossiness of 50 or higher, and has a ratio M/N of 0.2 or less, where M denotes a transmittance (%) of the void-containing resin molded product with respect to light having a wavelength of 400 nm to 800 nm, and N denotes a transmittance (%) of a void-free polymer molded product, with respect to the same light, having the same thickness as the void-containing resin molded product and consisting of the same polymer that forms the void-containing resin molded product.

6. A method for producing a void-containing resin molded product, the method comprising:

stretching a resin molded product consisting of a single polymer having crystallinity, which is free of incompatible resins, at a speed of 10 mm/min to 36,000 mm/min and at a stretching temperature T(° C.) which falls within the following range:

$$(Tg-30)(°C.) \leq T(°C.) \leq (Tg+50)(°C.)$$

where Tg denotes a glass transition temperature (° C.) of the polymer having crystallinity, wherein the void-containing resin molded product has elongated voids whose longitudinal directions are aligned in one direction, wherein the elongated voids satisfy the expression h(avg)>T/100, where h(avg) denotes an arithmetic average of h(i)s which each denote a distance from a surface of the void-containing resin molded product to a center of each of 10 voids whose centers are closer to the surface of the void-containing resin molded product than are centers of any other voids in a cross-section of the void-containing resin molded product that is perpendicular to a direction in which the voids are aligned, the 10 voids being selected from voids in a region defined by one straight line which is parallel to a thickness direction of the void-containing resin molded product and another straight line which is parallel to and distant by 20×T from the one straight line; and T denotes an arithmetic average thickness of the cross-section, wherein the elongated voids have a ratio L/r of 10 or more, where L denotes an average length of the voids (in μm) in the direction in which the voids are aligned, and r denotes an average length of the voids (in μm) in the thickness direction which is perpendicular to the direction in which the voids are aligned, and wherein the void-containing resin molded product has a glossiness of 50 or higher, and has a ratio M/N of 0.2 or less, where M denotes a transmittance (%) of the void-containing resin molded product with respect to light having a wavelength of 400nm to 800nm, and N denotes a transmittance (%) of a void-free polymer molded product, with respect to the same light, having the same thickness as the void-containing resin molded product and consisting of the same polymer that forms the void-containing resin molded product.

* * * * *